United States Patent [19]

Geiersbach et al.

[11] 3,784,890

[45] Jan. 8, 1974

[54] PULSE CONTROL CIRCUIT FOR A DC LOAD

[75] Inventors: Allois F. Geiersbach, Milwaukee; Raymond G. Price, Franklin, both of Wis.

[73] Assignee: Allis-Chalmers Corporation, Milwaukee, Wis.

[22] Filed: Dec. 12, 1972

[21] Appl. No.: 314,341

[52] U.S. Cl. ............................. 318/345, 321/45 C
[51] Int. Cl. .............................................. H02p 5/16
[58] Field of Search ............... 318/138, 694, 341, 318/345; 321/45 C

[56] References Cited
UNITED STATES PATENTS

| 3,518,520 | 6/1970 | Molnar | 318/341 X |
| 3,562,611 | 2/1971 | Gurwicz | 318/341 X |
| 3,582,764 | 6/1971 | Huber | 321/45 C X |
| 3,619,753 | 11/1971 | Thompson | 321/45 C X |

Primary Examiner—Bernard A. Gilheany
Assistant Examiner—Thomas Langer
Attorney—John P. Hines et al.

[57] ABSTRACT

A circuit for providing controlled pulses of direct current to vary the speed of a direct current motor. A main controlled rectifier applies current to the motor. A commutation circuit consisting of an inductor, a capacitor and another controlled rectifier turns off the main controlled rectifier by reversing its polarity. Another circuit, referred to as a "ring-around" circuit, consisting of another inductor and controlled rectifier reverses the polarity of the commutating capacitor preparatory to the commutation of the main controlled rectifier.

4 Claims, 1 Drawing Figure

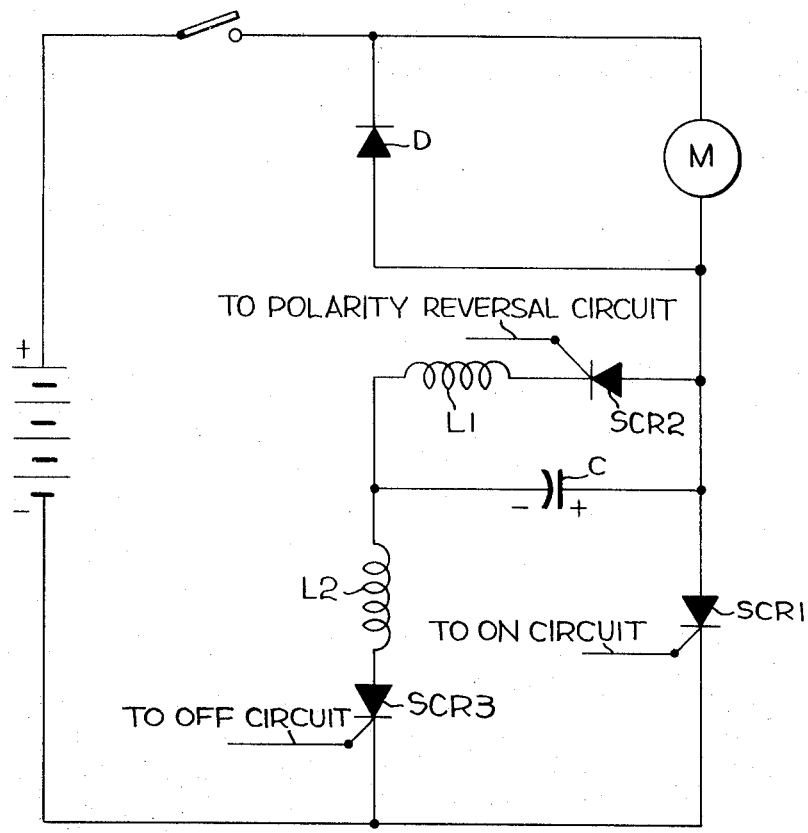

PULSE CONTROL CIRCUIT FOR A DC LOAD

This invention pertains in general to improvements relating to control means for electrical apparatus and more particularly to control means for providing controlled pulses of direct current to a direct current load.

The general purpose and object of the control of this invention is to provide smooth, stepless voltage control to a DC series motor which in turn provides smooth control of the motor speed. A method of control known as pulse width modulation (PWM) is utilized. A solid state switch, in this instance a silicon controlled rectifier (SCR) is used to switch the supply voltage on and off the motor rapidly. The ratio of on-time to off-time determines the average motor voltage and therefore the motor speed. The control utilizes a constant switching rate which is akin to frequency and varies the on-time to off-time ratio to achieve voltage control.

One particular circuit embodying the improvements according to the present invention which performs this time ratio PWM control is shown in FIG. 1.

A description and identification of each component in the preferred circuit shown in FIG. 1 is given below:

SCR1 — This is the main SCR which carries the motor current and is switched on and off to perform the PWM control.

SCR2 — This SCR is used in conjunction with inductor L1 to reverse the polarity of the commutating capacitor C. It is referred to as the ring-around SCR.

SCR3 — This is the commutating SCR which applies voltage on the commutating capacitor C across the main SCR1 to turn it off.

C — This is the commutating capacitor which stores energy to commutate the main SCR1.

L1 — This is the ring-around inductor used in conjunction with SCR2 to reverse the polarity of capacitor C.

L2 — This inductor limits the rate of rise of current in SCR3 and also along the inherent inductance in the battery overcharges the commutating capacitor C.

D — This is referred to as a free wheeling diode which carries motor current during the off-time of SCR1.

An SCR is considered forward biased when its anode is positive with respect to its cathode. It will conduct current in only one direction when a gate current is supplied if it has previously been forward biased. An SCR is turned off when its anode is negative relative to its cathode and when in this condition the SCR is said to be reverse biased. Once the SCR is reverse biased or commutated, it must be forward biased before it can be turned again by supplying a gate current.

Referring to the circuit diagram, the operation of the control will now be described. The circuit switch is closed and a gate current signal from the off circuit is applied to SCR3 which is forward biased causing SCR3 to turn on. The current then flows through the motor, the capacitor C, inductance L2, and the SCR3 causing the capacitor to charge to battery voltage with a forward polarity as shown in the drawing. Only a very short period of time is required to charge the capacitor. Once the capacitor is charged to the battery voltage, current flow stops.

At this point the main SCR1 is gated on, causing battery current to flow through the motor and the SCR1. As soon as SCR1 is gated on, the voltage across capacitor C is impressed across SCR3, reverse biasing SCR3, causing SCR3 to turn off. A short time is allowed to elapse after the gating of SCR1 to assure proper commutation (turn-off) of SCR3 and then SCR2, which is forward biased, is gated on.

By turning SCR2 on, the voltage across the capacitor C causes current to flow through SCR2 and inductor L1. That is, the energy stored in capacitor C is transferred to inductor L1 and then is transferred back to capacitor C. In the process of this energy transfer the polarity across capacitor C is reversed. This condition or process of capacitor reversal is referred to as "ring-around." After ring-around is complete, that is the capacitor C is fully charged in the reverse polarity, current ceases to flow in the ring-around circuit. SCR2 is automatically commutated off because of the reverse bias of its polarity after ring-around is completed. Furthermore, due to the reverse bias of capacitor C relative to that shown in the circuit diagram, the SCR3 is forward biased back to its original condition where it is again ready to be gated on.

Once the capacitor C is reversed in polarity and SCR2 is commutated off SCR1 can be turned off. The total on-time of SCR1 is, of course, controlled by the operator depending on whether he wants slow speed (short on-time) or high speed (long on-time). In either case, turn off of SCR1 is accomplished by gating on SCR3 which applies the commutating capacitor C across SCR1 reversing its polarity and effectively commutating SCR1. Load current through the motor continues to flow through the capacitor, inductance L2 and SCR3 until the capacitor is charged back to its original polarity as shown in the circuit diagram. Load current then continues to flow through free wheeling diode D.

The capacitor is actually able to charge to a voltage higher than the battery voltage because the energy stored in the battery and line inductance and inductor L2 is transferred to energy in the capacitor causing the extra voltage to be stored therein. At higher load currents this over voltage charge on the capacitor is significant, causing a final voltage on the capacitor significantly greater than battery voltage. This is helpful since it provides extra commutation energy needed to turn SCR1 off at higher currents.

SCR3 is commutated off in one of two ways. First, at higher load currents, capacitor C is able to charge to a voltage higher than battery voltage. When the energy in the line and battery inductance and inductor L2 has been totally transferred to capacitor C, the capacitor will try to force current back through diode D, the battery, SCR3 and L2 because it is at a higher voltage than the battery. As soon as this happens, SCR3 becomes reverse biased by a voltage equal to the difference between the battery and capacitor voltage causing it to turn off. Secondly, under light load currents and low percent on times for SCR1, current may still be flowing in capacitor C when SCR1 is turned back on and C may not yet be fully charged back to battery voltage. Under these conditions, when SCR1 is turned on again it automatically applies whatever voltage is across capacitor C across SCR3, reverse biasing it and causing it to turn off.

During the off period of SCR1 the motor current flows through the free wheeling diode D until SCR1 is again gated on. After the desired period of off-time SCR1 is again gated on and the cycle repeats itself.

The embodiments of the invention in which an exclusive property or privilege is claimed are defined as follows:

1. A control system for a direct current operated load comprising;
   a first controlled rectifier connected in series between a terminal of the load and the direct current source;
   second and third controlled rectifiers and first and second inductors all connected in series with said load and across said first controlled rectifier;
   a capacitor connected in parallel with said second controlled rectifier and said first inductor and in series with said third controlled rectifier, said second inductor, and said load;
   and gating signal sources connected to each of said controlled rectifiers.

2. The control system set forth in claim 1 wherein said direct current load is an electric motor and further comprising a rectifier diode connected across the motor to permit motor current to flow during the off period of said first controlled rectifier.

3. The control system set forth in claim 1 wherein said controlled rectifiers are silicon controlled rectifiers.

4. The control system set forth in claim 2 wherein said controlled rectifiers are silicon controlled rectifiers.

* * * * *